(12) United States Patent
Kato

(10) Patent No.: US 7,969,589 B2
(45) Date of Patent: Jun. 28, 2011

(54) PRINT CONTROL DEVICE, PRINT CONTROL METHOD AND COMPUTER PROGRAM

(75) Inventor: Yutaka Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 12/179,508

(22) Filed: Jul. 24, 2008

(65) Prior Publication Data

US 2008/0285078 A1   Nov. 20, 2008

Related U.S. Application Data

(62) Division of application No. 10/986,392, filed on Nov. 12, 2004, now Pat. No. 7,417,767.

(30) Foreign Application Priority Data

Nov. 25, 2003   (JP) ................................ 2003-394595

(51) Int. Cl.
*H04N 1/40* (2006.01)
(52) U.S. Cl. ...................................... 358/1.13; 358/468
(58) Field of Classification Search .................. 358/1.9, 358/1.13, 1.15, 468; 382/175, 177, 180, 382/182, 287, 306, 317
See application file for complete search history.

(56) References Cited

U.S. PATENT DOCUMENTS

| 5,404,294 | A   |   | 4/1995  | Karnik |
|-----------|-----|---|---------|--------|
| 6,301,013 | B1  | * | 10/2001 | Momose et al. ............. 358/1.15 |
| 6,595,126 | B2  | * | 7/2003  | Nagao et al. .................. 101/115 |
| 7,075,670 | B1  |   | 7/2006  | Koga |

FOREIGN PATENT DOCUMENTS

| JP | 09179699 A | * | 7/1997 |
| JP | 2000-39978 |   | 2/2000 |
| JP | 2000-071478 |  | 3/2000 |
| JP | 2002-44344 |   | 2/2002 |

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

In the invention, there is disclosed a print control device for overlaying, for example, a form being a fixed element of a form sheet with data to be embedded in the form and sending resulting data to a printing device to print the form sheet, including: overlay means for generating data obtained by overlaying a form corresponding to a selected form sheet with the data to be embedded in the form; transfer means for transferring environment information of the print control device, which affects output contents of the form sheet, to an external processing device; acquisition means for acquiring setting information sent back from the external processing device based on the environment information transferred by the transfer means and used at a time of printing; and sending means for sending the overlaid data so that an output operation is performed by use of the setting information acquired by the acquisition means.

9 Claims, 11 Drawing Sheets

| FIG. 5A |
|---------|
| FIG. 5B |

PRINT CONTROL DEVICE, PRINT CONTROL METHOD AND COMPUTER PROGRAM

This application is a divisional application of application Ser. No. 10/986,392, now allowed, filed Nov. 12, 2004, which is incorporated herein by reference.

BACKGROUND OF THE INVENTION

1. Field of the Invention

The present invention relates to a print control device, a print control method and a computer program, and more particularly to a print control device which is connected to another print control device via a communication network such as the Internet, etc., a print control method and a computer program.

2. Related Background Art

Conventionally, there has been known a form sheet printing system for printing a form sheet which is a fixed format consisting of ruled lines and characters.

In a form sheet printing system, print attributes with respect to form sheet data can be set in accordance with purposes such as determination of an output format of a form sheet. The term "form sheet data" as used herein refers to (1) a group of files which can be divided into a constantly fixed element such as ruled lines, etc. and an element varying according to documents embedded in the fixed element, or (2) data obtained by converting the two kinds of elements described above. The fixed element is hereinafter referred to as a form; the element varying according to documents is referred to as embedded data; data obtained by converting (overlaying) the two kinds of elements is referred to as form sheet data.

Print attributes may be set by a user employing an editor or the like when a form sheet is designed, or may be dynamically set at the time of printing by use of a form sheet printing system based on a server/client system. The print attributes thus set are described in form sheet data to be printed.

In prior art form sheet printing systems, a server/client system using a network is employed as a principal system. A server, clients and output devices are connected with each other via a network; print attributes can be set by each client with respect to a printing device specified as an output destination.

In form sheet printing systems based on a server/client system, a server typically manages form sheet data. When receiving form sheet print elements including the above described print attributes from a client, a server analyses the request and set the analyzed print attributes into an output destination printing device so that the form sheet is outputted from the specified printing device.

Disclosed in Japanese Patent Application Laid-Open No. 2002-44344 is a technique in which a client side of a client/server system acquires sheet type information for an image input/output device, the information being applied to a user interface provided by a printer driver.

SUMMARY OF THE INVENTION

Other features and advantages of the present invention will be apparent from the following description taken in conjunction with the accompanying drawings, in which like reference characters designate the same or similar parts throughout thereof.

However, in the case where form sheet data with specified print attributes is output to a printing device, when form sheet data with print attributes contained therein is output to a printing device whose setting has been modified in advance by a user when using the printing device, the setting modified by the user is used without change with respect to the print attributes which has not been set in the form sheet data. In such a case, even when a form sheet having an identical layout is output, the output format, depending on a print environment for a user, can vary according to prior settings.

In addition, in the case where a form sheet printing is conducted by use of a server/client system, or in the like case, when a printing device to which form sheet data with print attributes embedded therein is output can not be specified in advance, it can be difficult to decide whether the form sheet print attributes are actually applicable to the output destination.

To solve at least one of the problems above, it is desirable to have a control method for printing a form sheet, which method can maintain a form sheet format in the most unified manner possible without requiring a user to open a user interface to conduct a print setting.

To address at least one of the above problems, an object of the present invention is to provide a print control device, a print control method and a computer program, in which it is possible, for example, to print a form sheet by use of print attributes most appropriate to the form sheet and not depending on devices, and to output a form sheet in an identical format even when the output environment is changed.

According to an embodiment of the invention, there is disclosed a print control device for overlaying a form being a fixed element of a form sheet with data to be embedded in the form and sending resulting data to a printing device to print the form sheet, comprising: overlay means for generating data obtained by overlaying a form corresponding to a selected form sheet with data to be embedded in the form; transfer means for transferring environment information of the print control device, which affects output contents of the form sheet, to an external processing device; acquisition means for acquiring setting information sent back from the external processing device based on the environment information transferred by the transfer means and used at a time of printing; and sending means for sending the overlaid data so that an output operation is performed by use of the setting information acquired by the acquisition means.

DESCRIPTION OF THE PREFERRED EMBODIMENTS

Embodiment 1

A detailed description of preferred embodiments of the invention will now be given with reference to the accompanying drawings.

Figure 1:
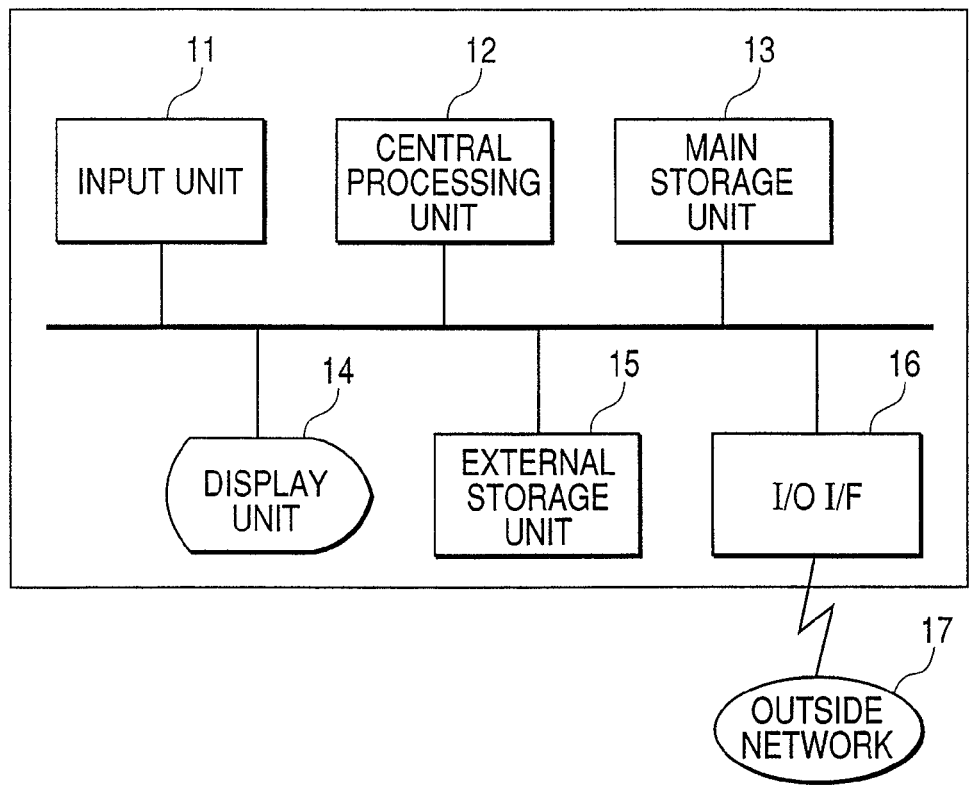
FIG. 1 is a block diagram showing the configuration of hardware according to an embodiment of the invention.

FIG. 1 is a block diagram showing the hardware configuration of a computer system included in a form sheet printing system according to an embodiment of the invention.

Regarding the computer system, a plurality of computer systems are connected to each other. The main part of the computer system comprises: a central processing unit 12 composed of a CPU; a main storage unit 13 composed of memory such as RAM and ROM; an external storage unit 15 composed of a FD drive, a HD drive or the like; an input unit 11 composed of pointing devices such as a keyboard and a mouse; a display unit 14 composed of a CRT display or the like; and an outside input/outside interface 16 connected to an outside network 17.

Figure 2:
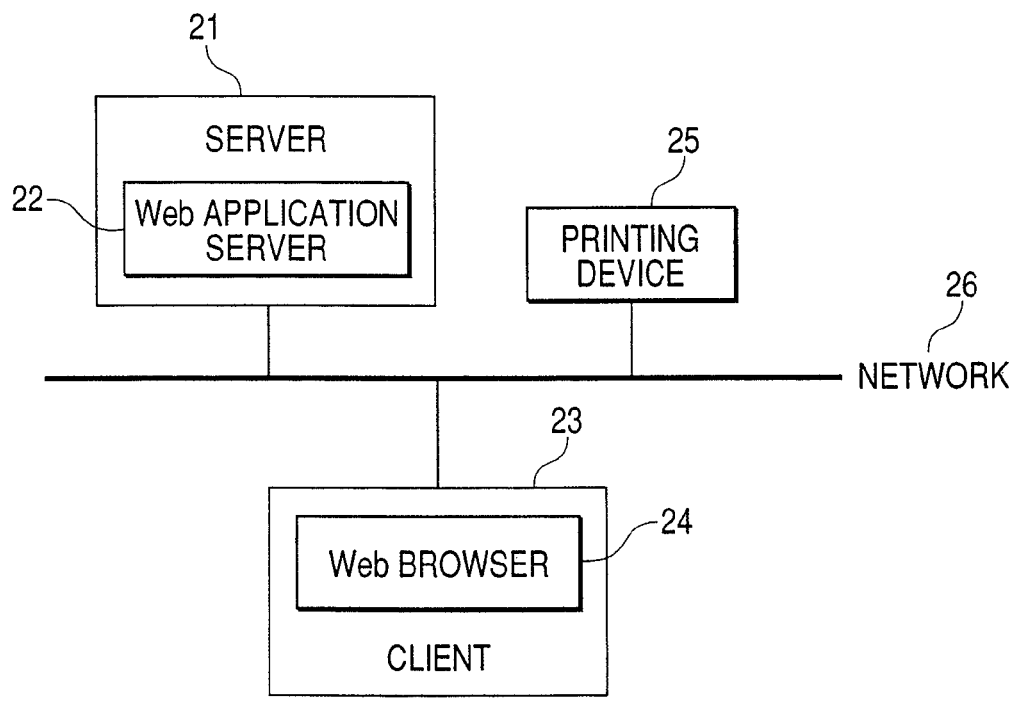
FIG. 2 is a block diagram showing the configuration of a network according to the embodiment of the invention.

FIG. 2 is a block diagram showing the network configuration of the form sheet printing system according to one embodiment of the invention.

The form sheet printing system includes a Web server 21 and a client 23, the hardware configuration of each device being shown in FIG. 1, and a printing device 25.

A Web application server 22 works on the Web server 21; a Web browser 24 working on the client 23 is connected to the server 22 via an outside network 26 such as LAN/WAN or the Internet. Provided on the same outside network 26 is the printing device 25 which is accessible from the Web server 21 and client 23.

The Web server 21 and client 23 according to the embodiment are respectively operated by the CPU of the central processing unit 12 executing a basic I/O program, OS and control program.

The basic I/O program is written into the main storage unit 13; the OS is written into the HD of the external storage unit 15. When each computer system is activated, the OS is read from the HD of the external storage unit 15 into the RAM of the main storage unit 13 by use of an IPL (initial program loading) function of the basic I/O program, thereby starting the operation of the OS. The control program includes program codes generated based on a flowchart of a control procedure shown in FIGS. 5A and 5B.

Figure 3:
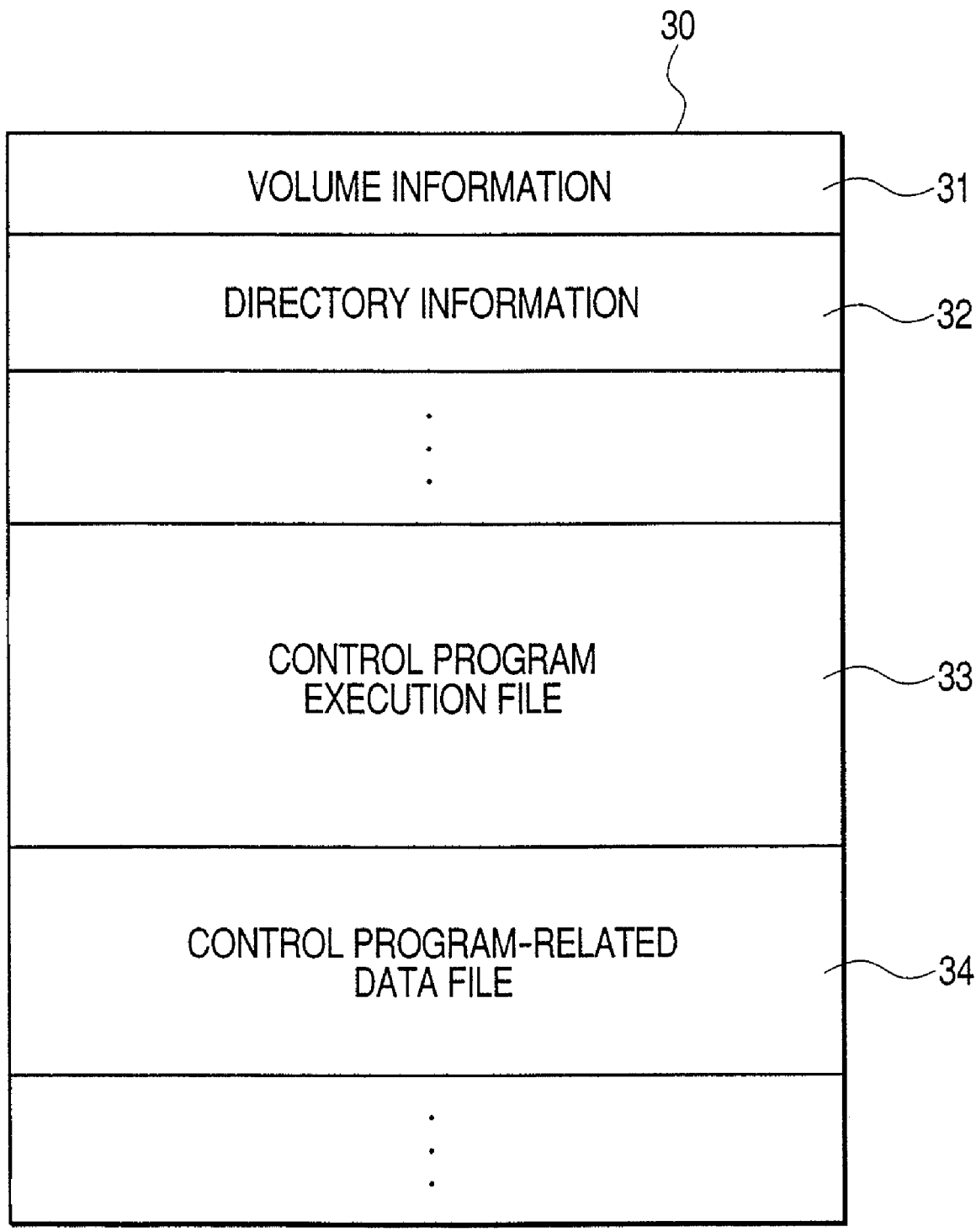
FIG. 3 is a diagram showing the configuration of contents recorded on a medium according to the embodiment of the invention.

According to the present embodiment, the control program and its relevant data are recorded on the FD (or HDD) of the external storage unit 15. An exemplary configuration of the recorded contents is shown in FIG. 3. Referring to FIG. 3, the FD 30 includes volume information 31, directory information 32, control program execution file 33 and control program relevant data file 34. In addition, in the external storage unit 15 of the client shown in FIG. 1, there is stored as one part of the control program a printer driver program related to image generation including a process of overlaying a form sheet with print data. The printer driver invokes API of an operating system 42 and outputs print data (form sheet data) related to image generation to a printer.

The control program and its relevant data recorded on the FD can be loaded into the computer system through a FD drive of the external storage unit 15. When the FD is set into the FD drive of the external storage unit 15, the control program execution file 33 and the control program relevant data file 34 are read out from the FD under a control of the OS and basic I/O program and then loaded into the RAM of the main storage unit 13 for execution.

Figure 4:
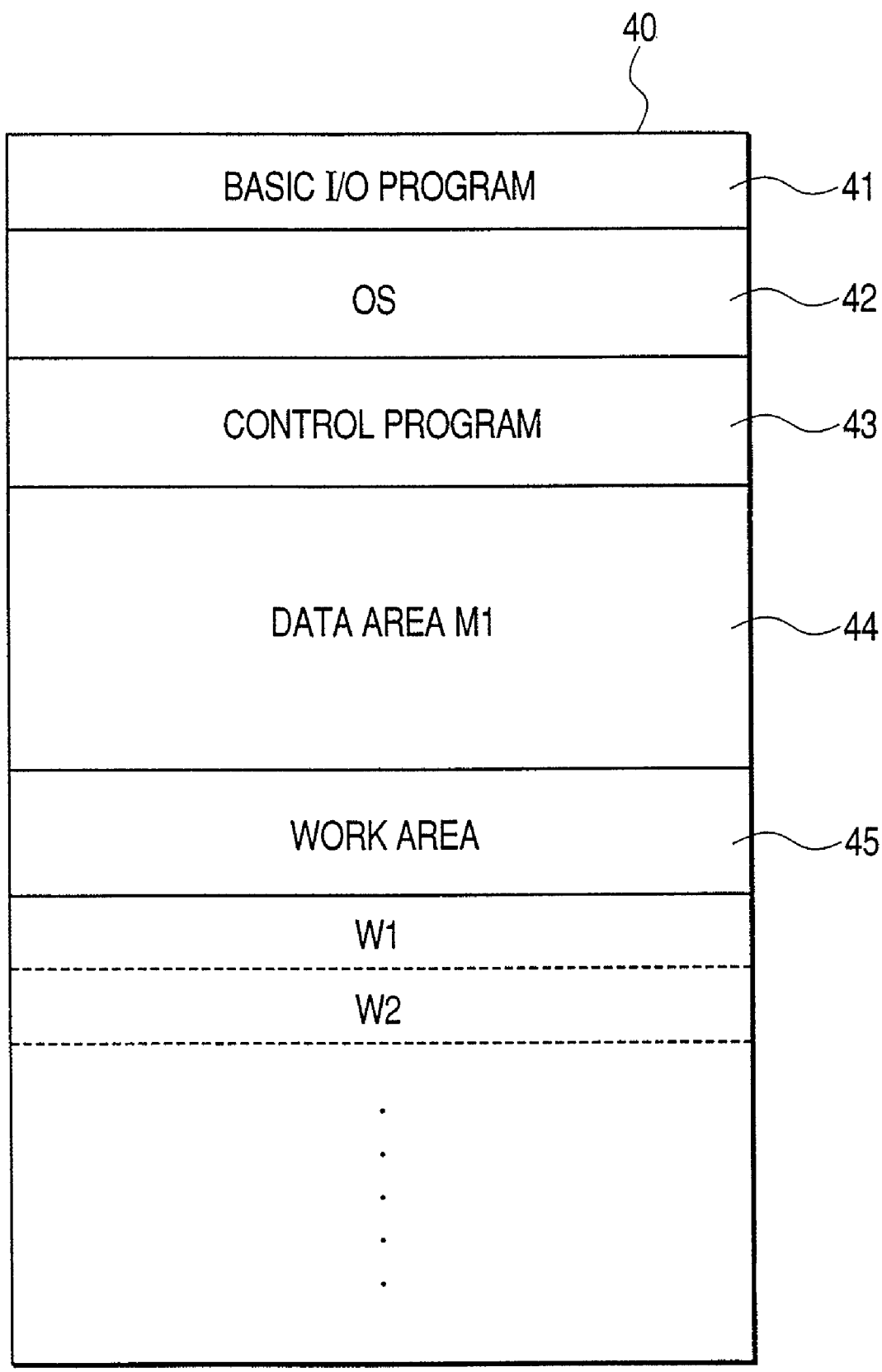
FIG. 4 is a diagram showing the configuration of an executable storage area according to the embodiment of the invention.

FIG. 4 shows an executable memory map obtained when the control program is loaded into the RAM. As shown in FIG. 4, the RAM 40 includes basic I/O program 41, OS 42, control program 43, data area 44 and work area 45.

In the present embodiment, an example is shown in which the control program and its relevant data are loaded from the FD directly into the RAM 40 for execution. Alternatively, the control program and its relevant data may be once stored (installed) into the HD of the external storage unit 15; when the control program is activated, the program and data is loaded from the HD into the main storage unit 13. Apart from the FD, a CD-ROM, an IC memory card or the like may be employed as the medium for recording the control program. Furthermore, the control program may be recorded onto a ROM (read-only memory) and arranged so as to constitute one part of the memory map, so that the control program can be executed directly by the central processing unit 12.

Various forms and hereinafter-described print setting initialization files are stored in the Web server 21. When the Web server 21 receives a print request including embedded data from the client 23 through the Web browser 24, the Web server 21 analyses the print request based on the execution of the Web application server 22 and then searches for a form corresponding to the analysis result. The forms and print setting initialization files can be stored in a database or another Web server (not shown) connected to the network 26.

In the client 23, there is stored a program (referred to below as a helper which can identify a MIME type assigned to a file received from the outside, thereby handling the MIME type. The MIME type is used to set the property of a file on the Web. The helper may be an application program separate from the browser, or a program using a plug-in technique or the like which can be handled within the browser. A detailed description of the operation of the client 23 based on the execution of the helper will be given later.

Figures 5, 5A:
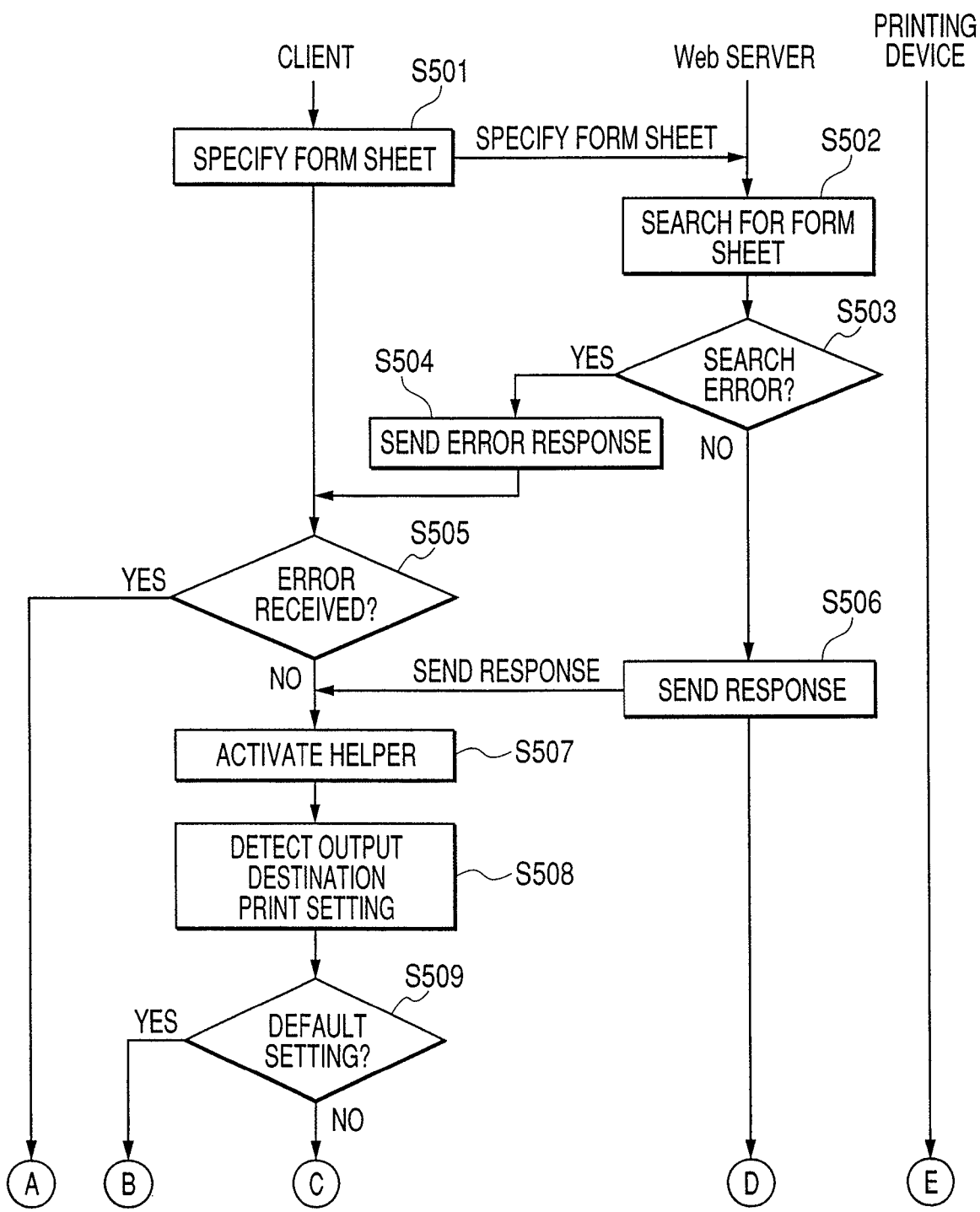
FIG. 5 is comprised of FIGS. 5A and 5B showing flowcharts of an operation according to the embodiment of the invention.
Figure 5B:
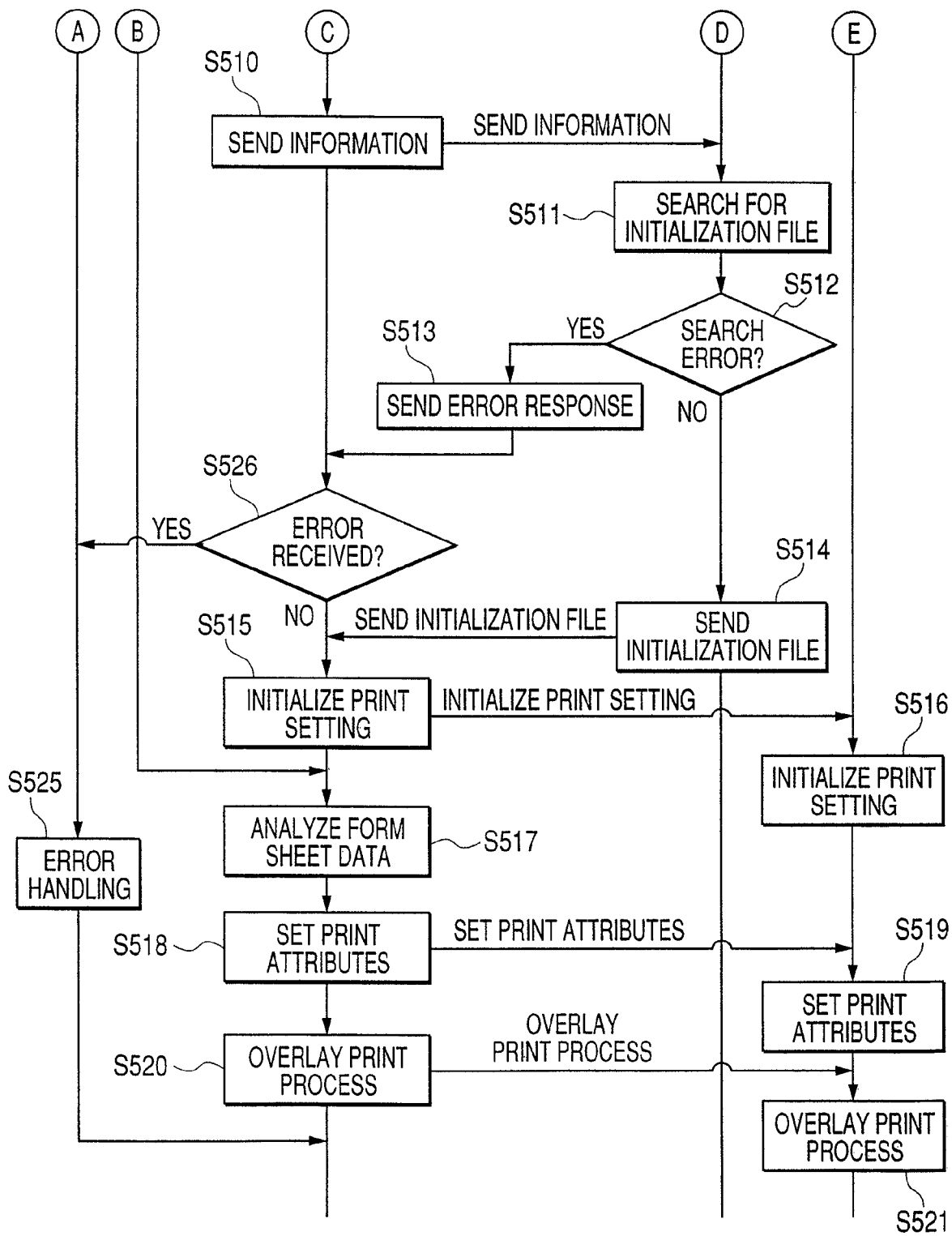

A detailed description of the operation according to the embodiment will now be given with reference to a flowchart shown in FIGS. 5A and 5B.

Firstly, from a HTML window for issuing a print request displayed on the Web browser 24, a user of the client 23 properly selects a form sheet name, embedded data and print attributes such as a printer name and the number of copies, which attributes are needed when the data is output to the printing device 25. The print request including the selected information is sent to the Web server 21 (S501).

Figure 6:
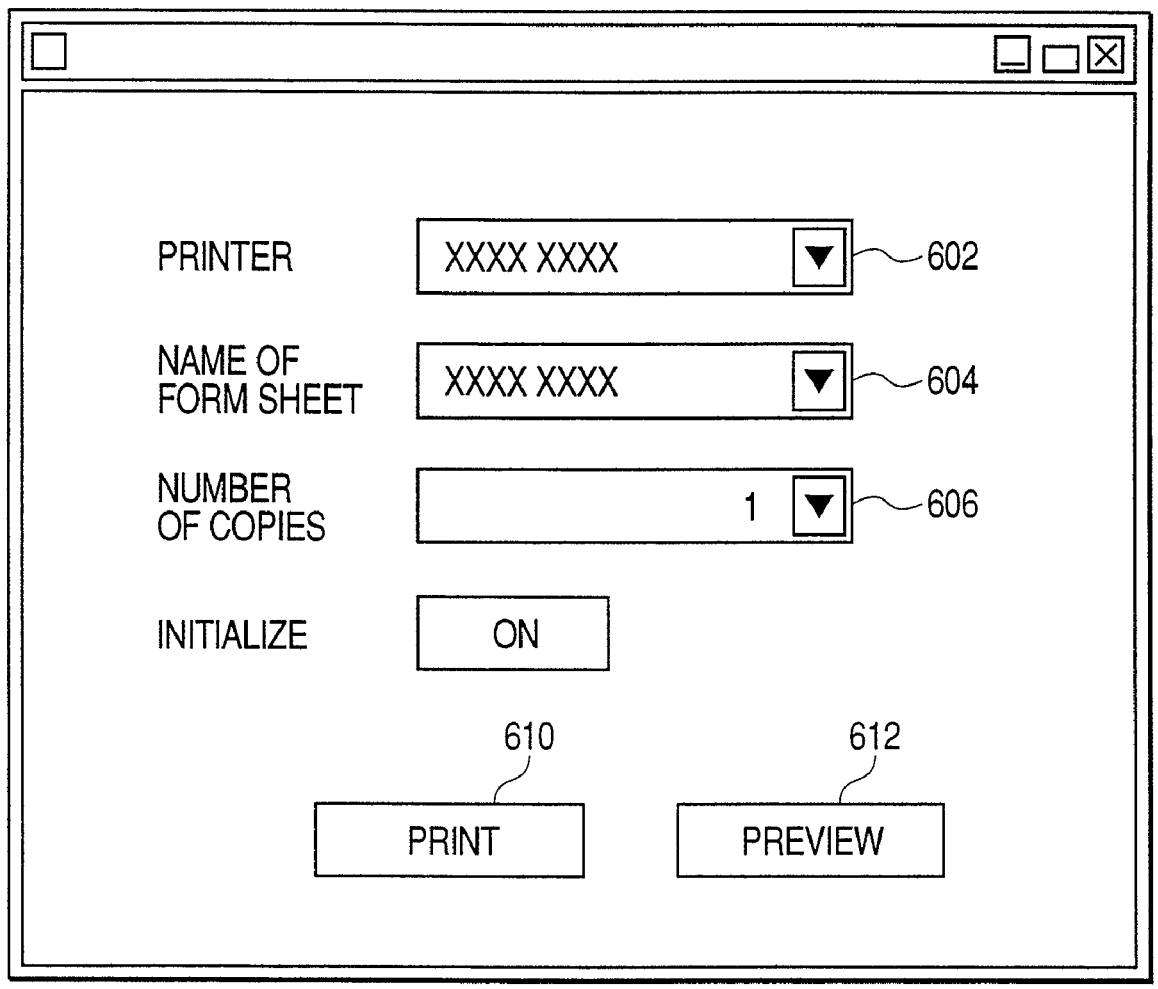
FIG. 6 is a diagram showing an exemplary HTML window displayed on a Web browser of a client.

FIG. 6 shows an exemplary HTML window displayed on the Web browser 24 of the client 23 in the step S501. The window shown in FIG. 6 includes a list box 602 for selecting a printer name, a list box 604 for selecting a form sheet name and a list box 606 for selecting the number of copies. After selecting the desired items from the list boxes 602, 604 and 606, the user presses a button 608 to specify initialization of the printing device. To conduct a print operation according to the selected information, a button 610 is pressed. In response to the user operation, the client 23 sends the print request including the selected information to the Web server 21.

When receiving the request, the Web server 21 analyses the contents of the received print request and determines the kind of a form sheet, which is needed to conduct the requested print, and then searches for all the forms needed to constitute the form sheet (S502).

If all the forms needed to constitute the requested sheet can not be found on the Web server 21, or if they can not be found on a database or another Web server to which the Web server 21 accesses for a form sheet, the Web server 21 sends to the client 23 an error response indicating that the search for the form sheet has failed (S503, S504).

If the browser 24 on the client 23 side receives the error response from the Web server 21 in a step S504, then the operation can be finished without performing the subsequent process (S505, S525). In this case, a dialogue box including a message such that "the selected form can not be found" may be displayed on the display unit 14.

When the searched form sheet is all found, all embedded data layout files constituting the form sheet (information as to in which position of a page each character and the like in the embedded data are to be printed) are combined with the embedded data corresponding to the layout files; the resultant data is subject to an appropriate compression process or the like, thereby generating an archive. Then, form sheet file data having a particular extension identifier and assigned to a particular MIME type is generated on the Web server 21 by adding a header and the like to the generated archive. The file is sent to the client 23 as a response (S506). The print related setting input through the browser of the client 23 is embedded into the file. In some cases, the print related setting may also be embedded in advance into the embedded data layout files constituting the form sheet.

While the client 23 receives the response, the Web browser 24 saves the received response as a cache file into a temporary file. Then, the Web browser 24 invokes a helper in accordance with the MIME type assigned to the file type of the received file (S507).

The preparation for the analysis and printing of the form sheet data is achieved by the processes described above. Next, a process of initializing the print setting of an output destination will be described below.

The activated helper detects the print setting of the printing device 25 specified as an output destination from the cache file (S508) to decide whether the setting remains unchanged from the factory default values (S509). Information (print setting) set in advance with respect to the output destination printing device 25 is written into the registry and the like of the client 23. Therefore, by referring the values, it can be decided whether the setting has not been changed yet. If the setting of the printing device 25 remains unchanged from the factory default values, then the following setting initialization process is bypassed and the flow proceeds to a step S517 (form sheet data analysis).

If the setting of the printing device 25 has been changed from the factory default values, then a process of changing back the setting of the printing device 25 to the default values is performed as described hereinafter. Firstly, the kind of an OS of the client 23, the version of the printer driver which has been installed, the model of the output destination printing device 25 and other information are sent to the Web server 21 as information regarding the output destination printing device 25 and the host which sends a print command to the device 25 (S510).

The Web server 21 analyses the received information to search for a print setting initialization file appropriate to the print environment of each client 23 (S511). Herein, as an exemplary management structure of a print setting initialization file to be searched for on the Web server 21, there may be assumed a structure shown in FIG. 7. This is a database which can be divided hierarchically into three types of information: The kind of an OS (Win2000, Win98, WinNT, etc.) installed into a computer system; the version of a printer driver; and the model of a printing device (print setting initialization file for printer A: printerA.dev, print setting initialization file for multifunctional peripheral device B: MFPB.dev). Thus, specifying of the above three types of information allows a print setting initialization file for initializing an output device registered with a particular client 23 to be searched for. As an exemplary print setting initialization file, there may be assumed a file shown in FIG. 8. The file shown in FIG. 8, known as a DEVMODE structure, has these sections: header information including an identifier (extension) for identifying the file, the driver name and model (device) name of an output destination printing device and the like; print setting information common to each printer, such as double face printing, sheet size and the like; and extended print setting information specific to each printer, such as staple setting. Each print attribute is set by default before shipment.

If a print setting initialization file appropriate to the client environment can not be found on the Web server 21, or if it can not be found on a database or another Web server to which the Web server 21 accesses for a print setting initialization file, the Web server 21 sends to the client 23 an error response indicating that the search has failed (S512, S513).

If the browser on the client 23 side receives the error response from the Web server 21 in a step 513, then the operation can be finished without performing the subsequent process (S526, S525). In this case, a dialogue box including a message such that "the initialization file can not be found" may be displayed on the display unit 14.

When the print setting initialization file appropriate to the client environment are found on the Web server 21, the file is subject to an appropriate compression process, etc. and sent to the client 23 (S514). The client 23 analyzes the received print setting initialization file to set the print attributes with respect to the output destination printing device 25 by use of Windows (registered trademark), API for setting provided by various printer vendors, etc. to conduct initialization (S515, S516).

Subsequently, the client 23 analyzes the form sheet data received in a Step S506 (S517). While reading the form sheet data, the client 23 separates each data part (management header, print setting information header, embedded data, embedded data layout file) and saves theses data onto memory. In some system configurations, such information can be appropriately saved onto a HD, etc.

Based on the print setting information described in the analyzed form sheet data, attribute setting with respect to the printing device 25 is performed by use of a method similar to the print setting initialization process in the step S515 (S518, S519). When the print attributes are embedded in advance in the embedded data layout file, the setting of the attributes is also performed with respect to the printing device 25. The process overwrites the initialized setting of the printing device 25 with the setting for each form sheet.

The client 23 performs an overlay process based on the analyzed form sheet data and then sends the generated data to the output device. Thus, the form sheet is printed based on the data received by the printing device (S520, S521).

The decision process in the step S526 can be made optional. In this case, on the HTML window shown in FIG. 6, there may be provided a check box for specifying whether initialization is needed every time, for example; when the client 23 receives the input through the HTML window, the information regarding the selection regarding the check box is saved. When the client 23 receives an error response in the step S513, the saved information is referred. If initialization is needed, an error handling is performed to finish the operation (S525). On the contrary, if initialization is not needed, then the error handling is not performed and the flow proceeds to the step S515.

In short, there was explained the client 23 as an exemplary print control device which overlays a form being an exemplary fixed element of a form sheet with data to be embedded in the form and sends the resulting data to a printing device to print the form sheet. The client 23 comprises: the external storage unit 15 being exemplary form storage means for storing a plurality of the forms described above; and the printer driver being exemplary overlay means for generating data obtained by overlaying a form selected from the forms stored in the external storage unit 15 and corresponding to the selected form sheet with data to be embedded. In addition, the control program stored in the external storage unit 15 transfers to the Web server 21 the version and kind of an operating system being an example of environment information on the client 23, which affects the output contents of a form sheet, and the information on a printer selected by the client side. Then, the control program acquires DEVMODE being exemplary setting information used at the time of printing; DEVMODE is sent back from the Web server 21 based on the above environment information transferred by the control program. Subsequently, the control program sends the overlaid print data to the printer to output the data by use of the acquired DEVMODE. The environment information can be any information used for a printing system and is not limited to the information described in the present embodiment.

The Web server 21, a device separate from the client 23, is provided in the external storage unit thereof with a control program separate from the one installed on the client side. The control program on the Web server 21 has a database for managing DEVMODE being exemplary setting information on a printing operation of overlaying a form being a fixed element of a form sheet with data to be embedded in the form and sending the resulting data to a printing device to print the form sheet; the control program acquires the environment information of the client 23 which is the output source or originating source of a form sheet. In addition, by use of the acquired environment information, the control program acquires DEVMODE, which is managed as a database shown in FIG. 7 and FIG. 10, and transfers the acquired DEVMODE to the client 23.

In the database, DEVMODE is managed for: each device ID or model number being information indicating the kind of a printing device selected by the client 23 as an output source, an example of the printing device being a laser printer, an ink jet printer, a facsimile or a complex device; each kind or version of an operating system installed in the client 23; or each kind or version of a device driver installed in the client 23.

Using as a key these information obtained as environment information acquired in advance, the control program on the Web server 21 side searches for and acquires DEVMODE being an example of appropriate print setting information from the database.

Figures 9, 9A:
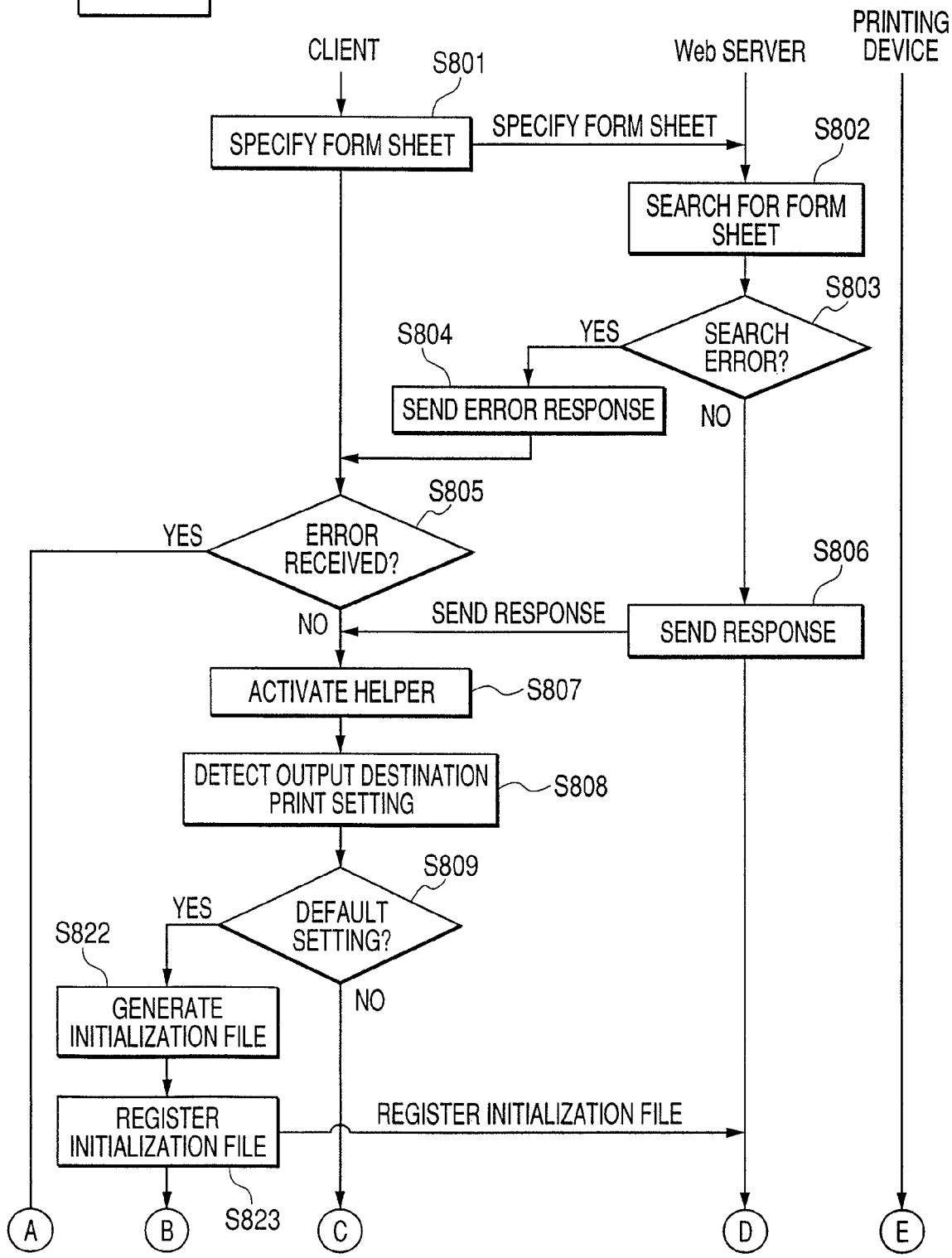
FIG. 9 is comprised of FIGS. 9A and 9B showing flow-charts of an operation according to another embodiment of the invention.
Figure 9B:
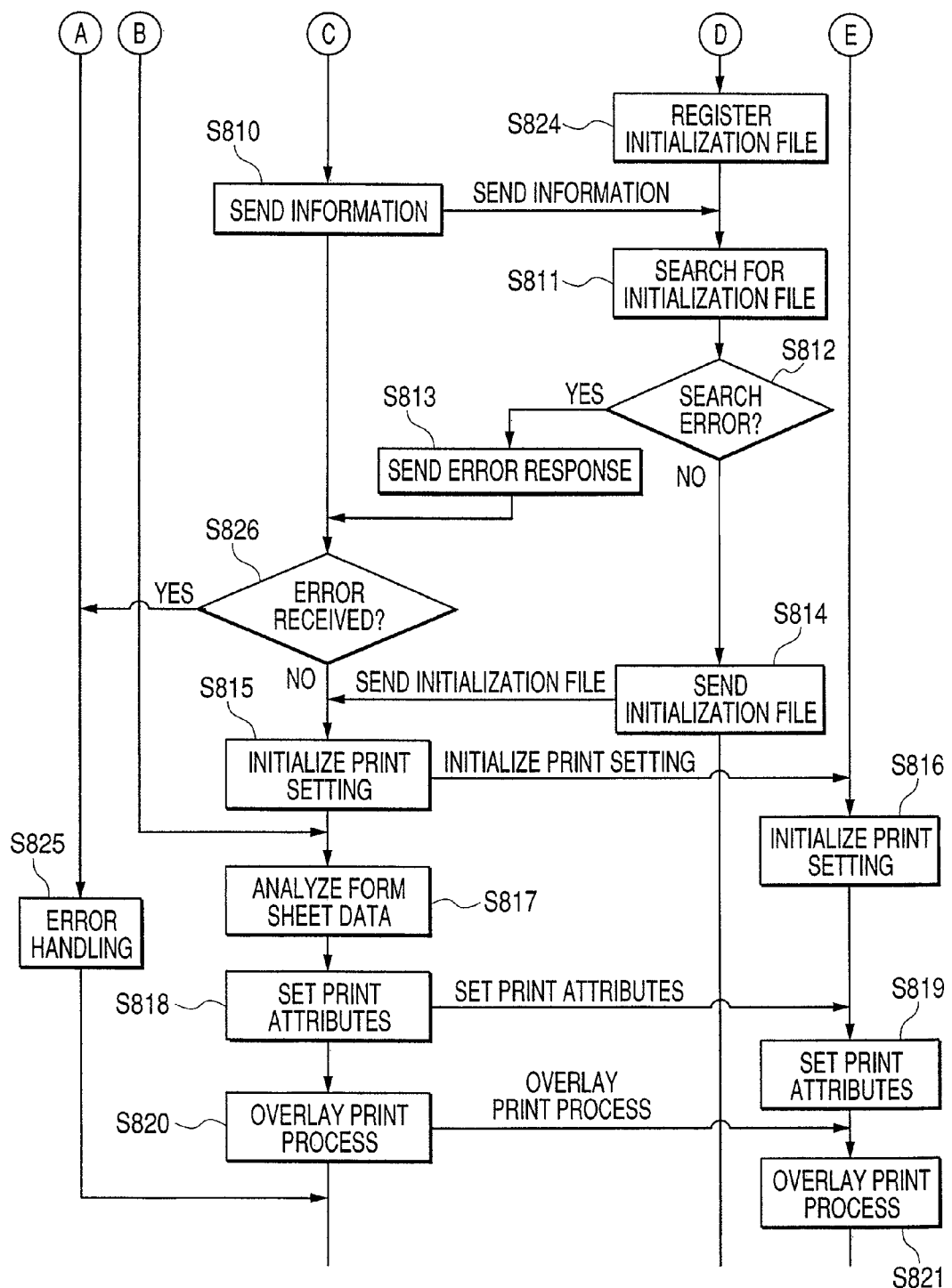

Next, a detailed description of a second embodiment of the invention will be given with reference with a flowchart shown in FIGS. 9A and 9B.

Referring to the drawing, the processes in steps S801 to S821, S825 and S826 are completely identical with those of the steps S501 to S521, S525 and S526.

If it is decided in a step 809 that the print setting of an output destination printing device 25 remains unchanged from the factory default values, then a helper generates a print setting initialization file in the client 23 (S822). Specifically, the helper extracts the default print attribute values from the printing device 25 through a printer driver and outputs the print setting initialization file in a format identical with the one used in the precedent embodiment.

The helper sends to the Web server 21 the print setting initialization file generated by use of the print environment information (i.e. the kind of an OS, the version of a printer driver, the model of a printing device) of the client 23 (S823).

Figure 7:
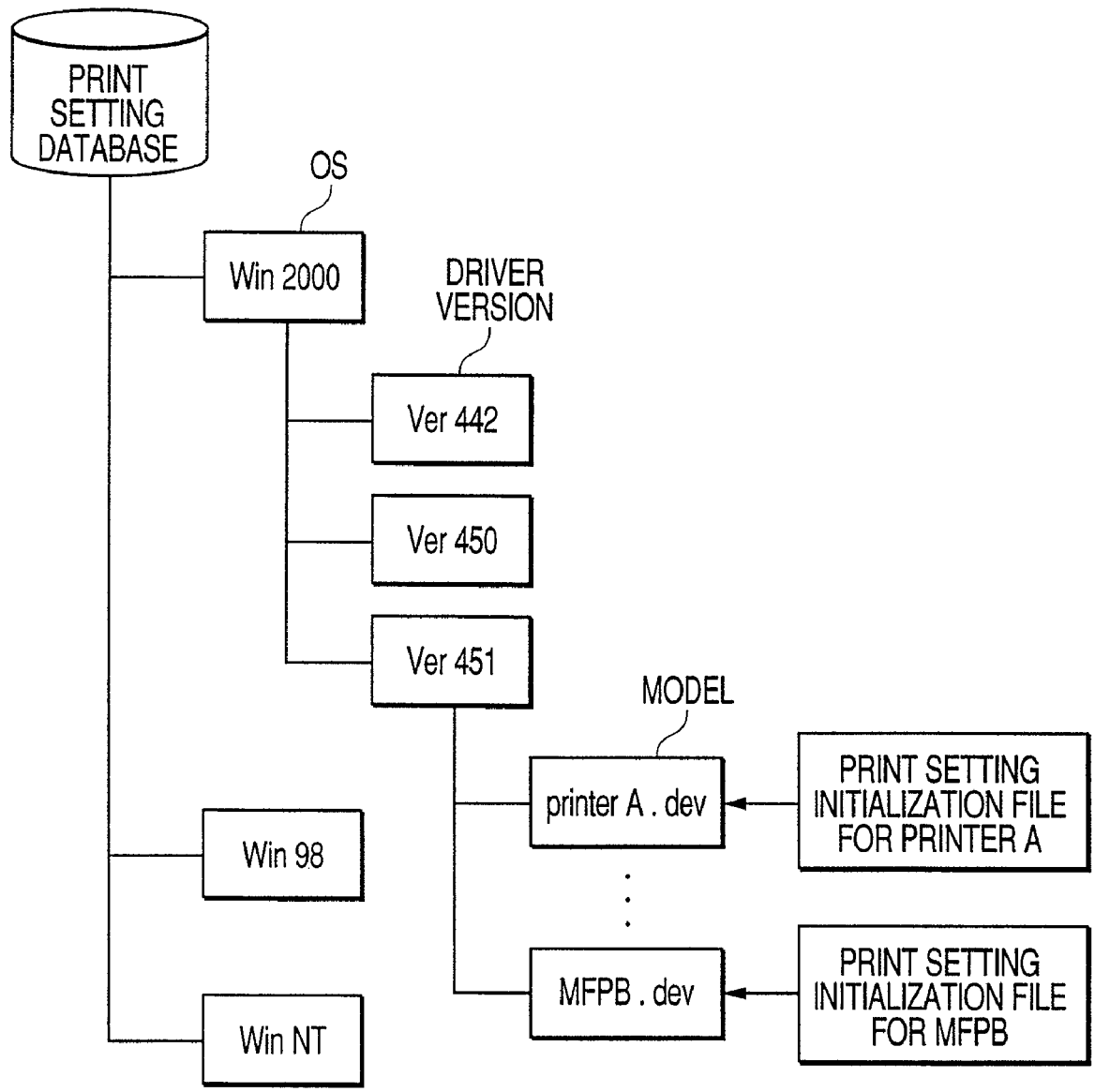
FIG. 7 is a diagram showing an initialization file management structure according to the embodiment of the invention.
Figure 8:
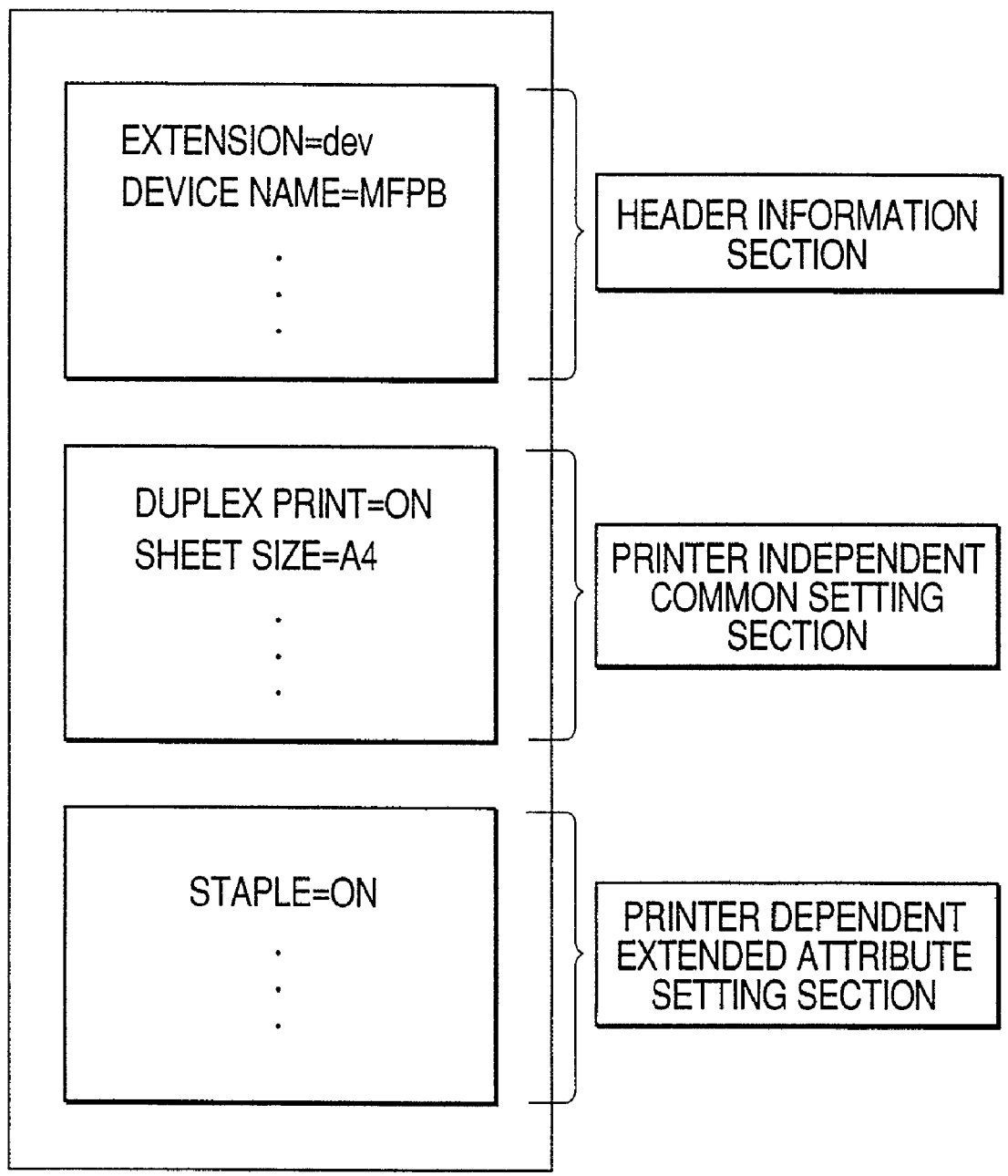
FIG. 8 is a diagram showing the structure of a print attribute setting file according to the embodiment of the invention.

Based on the received information, the Web server 21 stores the print setting initialization file into an appropriate location in a hierarchical management structure shown as an example in FIG. 7 (S824).

In the client 23, after registration of the initialization file, the flow proceeds to a form sheet data analysis process. The subsequent operation is identical with the one in the precedent embodiment.

In the embodiment described above, the client 23 side decides whether the print setting initialization file is acquired from the Web server 21, or whether the print setting initialization file is registered with the Web server 21. The decision, however, may be conducted by the Web server 21 side. For example, the Web server 21 may be set so that the client 23 acquires the initialization file independently of the print environment state of the client 23. In addition, the Web server 21 may be set so that the initialization file is registered from the client 23 whenever a test operation is activated or whenever an environment is created.

Figure 10:
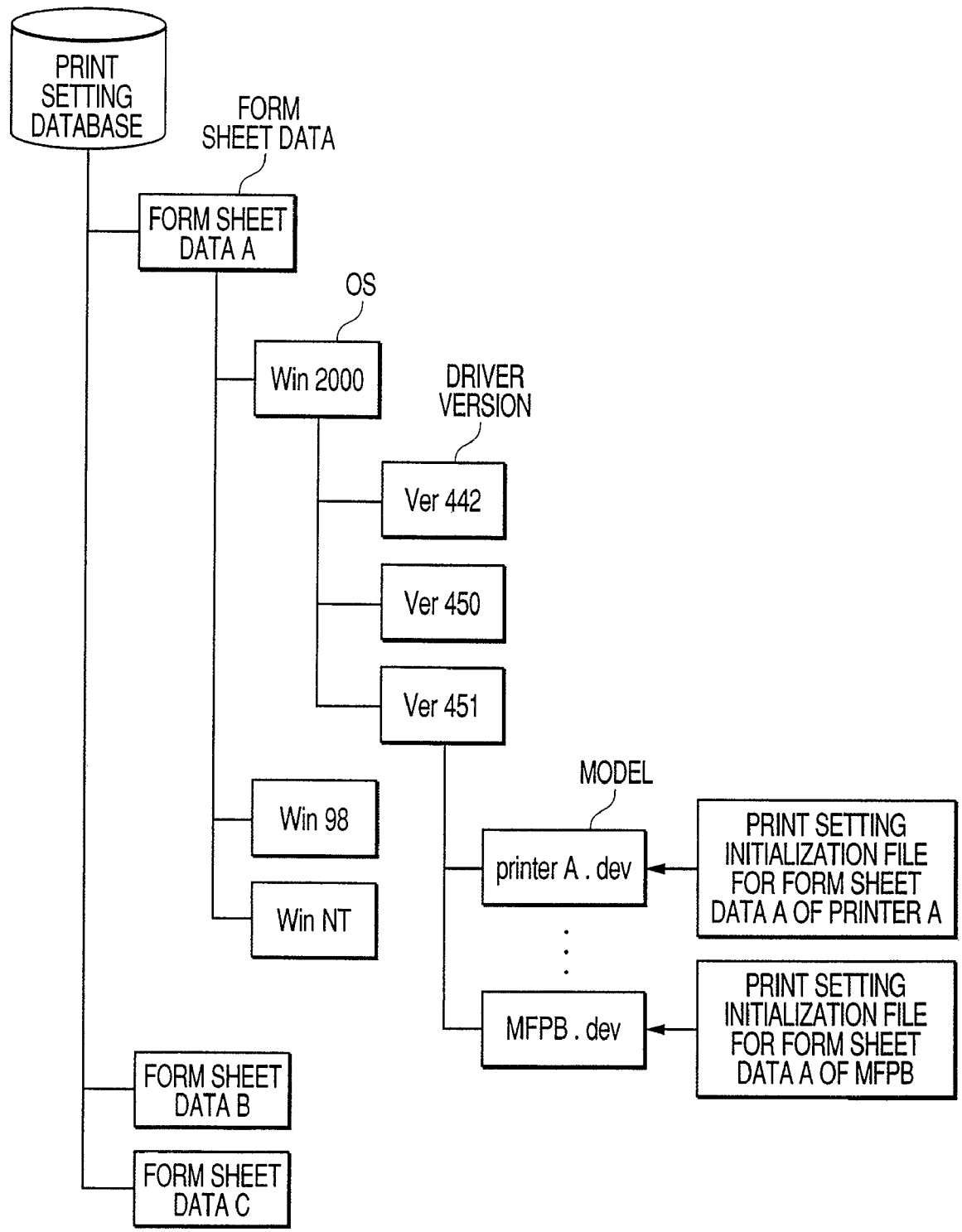
FIG. 10 is a diagram showing a print attribute setting file management structure according to the embodiment of the invention.

According to the embodiment described above, to adjust the setting of the printing device 25 to the form sheet print setting, firstly initialization is conducted by use of the initialization setting file and then the resulting setting is overwritten by the setting for each form sheet. Alternatively, the print setting initialization file may be prepared for each form sheet, so that the setting with respect to the printing device 25 can be conducted all at once by use of the file. Specifically, in this case, there is provided a database which can be divided into data for each print environment information and each form sheet data as shown in FIG. 10. In the same drawing, unlike in the case of FIG. 7, the print setting initialization file for printer A, the print setting initialization file for printer B, etc. are stored for each form sheet data. When receiving a print request from the client 23, the Web server 21 sends back to the client 23 the print environment information and a print setting initialization file corresponding to the form sheet data.

In the present embodiment, the initialization process with respect to the printing device 25 by the client 23 may also be conducted by use of a print setting described in advance in the form sheet data and a print setting initialization file acquired from the Web server 21. In this case, the Web server 21 or the client 23 may conduct the selection of a setting method, such as whether to merge the print setting described in advance in the form sheet data into the print setting initialization file acquired from the database, or whether to invalidate the print setting described in advance in the form sheet data, or whether to use only the print setting described in the form sheet data. It will easily be understood that the selection can be conducted by use of a HTML window, for example.

According to the precedent embodiment, since the factory default values are applied apart from the print attributes described in a form sheet data, a flexible control can not be performed. According to the present embodiment, however, any attribute other than the one set into a form sheet data can be specified, thereby enabling a more complex control.

According to the first embodiment, the printing device 25 is initialized by use of a print setting initialization file managed on the Web server 21. Alternatively, when possible, the printing device 25 may be initialized by the client 23 alone, without using the print setting initialization file on the Web server 21. In this case, a helper initializes the output destination printing device 25 by use of various APIs or a print setting initialization file, etc. stored in advance in the client 23.

According to this embodiment, the management of a print setting initialization file on the Web server 21 is not needed; the sending of output environment information (OS information, etc.) and the search and sending of an initialization file are not performed, thereby improving simplicity and effectiveness.

The embodiments described above are principally intended for a form sheet printing system based on a server/client system. According to the present embodiment, the setting of a printing device 25 is adjusted to a setting described in a form sheet data. This method can also be applied to a form sheet printing system not using a network. In this case, the only difference from the first to third embodiments is that the processes executed in the Web server 21 and the client 23 are carried out in the same computer.

This application claims priority from Japanese Patent Application No. 2003-394595 filed on Nov. 25, 2003, which is hereby incorporated by reference herein.

What is claimed is:

1. An information processing apparatus for communication with a print control device, comprising:
 a management unit configured to manage a plurality of setting information for a printing operation of overlaying a form with data to be embedded in the form, the form being a fixed element of a form sheet;
 a first acquisition unit configured to acquire environment information of the print control device, wherein the environment information indicates a kind or version of software operated in the print control device; and
 a second acquisition unit configured to acquire a respective setting information managed by the management unit by use of the environment information acquired by the first acquisition unit,
 wherein the respective setting information acquired by the second acquisition unit is used for printing the form sheet, and
 wherein the management unit manages setting information corresponding to the environment information of the print control device, for each form of a plurality of forms.

2. An information processing apparatus according to claim 1, wherein the respective setting information is provided to initialize settings of the print control device.

3. An information processing apparatus according to claim 1, wherein the printing operation of overlaying a form with data to be embedded in the form is performed in the print control device.

4. A method for an information processing apparatus for communication with a print control device, comprising:
 a management step of managing a plurality of setting information for a printing operation of overlaying a form with data to be embedded in the form, the form being a fixed element of a form sheet;
 a first acquisition step of acquiring environment information of the print control device, wherein the environment information indicates a kind or version of software operated in the print control device; and
 a second acquisition step of acquiring a respective setting information managed in the management step by use of the environment information acquired in the first acquisition step,
 wherein the respective setting information acquired in the second acquisition step is used for printing the form sheet, and
 wherein the management step manages setting information corresponding to the environment information of the print control device, for each form of a plurality of forms.

5. An information processing method according to claim 4, wherein the respective setting information is provided to initialize settings of the print control device.

6. An information processing method according to claim 4, wherein the printing operation of overlaying a form with data to be embedded in the form is performed in the print control device.

7. A non-transitory computer-readable medium storing a computer program for an information processing apparatus for communication with a print control device, said program comprising:
 a management step of managing a plurality of setting information for a printing operation of overlaying a form with data to be embedded in the form, the form being a fixed element of a form sheet;
 a first acquisition step of acquiring environment information of the print control device, wherein the environment information indicates a kind or version of software operated in the print control device; and
 a second acquisition step of acquiring a respective setting information managed in the management step by use of the environment information acquired in the first acquisition step,
 wherein the respective setting information acquired in the second acquisition step is used for printing the form sheet, and
 wherein the management step manages setting information corresponding to the environment information of the print control device, for each form of a plurality of forms.

8. A non-transitory computer-readable medium according to claim 7, wherein the respective setting information is provided to initialize settings of the print control device.

9. A non-transitory computer-readable medium according to claim 7, wherein the printing operation of overlaying a form with data to be embedded in the form is performed in the print control device.

* * * * *